July 27, 1926.

F. L. FULLER

CASH REGISTER

Filed May 23, 1918

Inventor
FREDERICK L. FULLER

Earl Benst
Attorney

July 27, 1926.

F. L. FULLER

CASH REGISTER

Filed May 23, 1918

Inventor
FREDERICK L. FULLER

Carl Beust
Attorney

July 27, 1926.

F. L. FULLER 1,594,167

CASH REGISTER

Filed May 23, 1918

Inventor
FREDERICK L. FULLER

Carl Beust
Attorney

July 27, 1926.

F. L. FULLER 1,594,167

CASH REGISTER

Filed May 23, 1918     5 Sheets-Sheet 4

Inventor
FREDERICK L. FULLER
Carl Beust
Attorney

July 27, 1926.

F. L. FULLER

CASH REGISTER

Filed May 23, 1918   5 Sheets-Sheet 5

Inventor
FREDERICK L. FULLER
Carl Beust
Attorney

Patented July 27, 1926.

1,594,167

UNITED STATES PATENT OFFICE.

FREDERICK L. FULLER, OF BRIDGEPORT, CONNECTICUT, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed May 23, 1918. Serial No. 236,201.

This invention relates to improvements in cash registers, the primary object of which is to devise a mechanism of the general type illustrated in U. S. patents to Carroll 751,611 and 773,053 with a keyboard control mechanism in place of the setting levers therein used. This change of control in the present machine necessitates various minor changes in the mechanism illustrated in the above noted patents both in structure and timing of the functions of the parts, the principle of the machine, however, remaining unchanged.

Another object of the present improvement is to devise a novel form of keyboard construction which comprises but very few parts and which may be both rapidly manufactured and assembled.

Another object of the present improvement is to devise a novel form of differential mechanism cooperating with the novel keyboard above mentioned.

A further object is to provide the improved register with a bank of special transaction keys, a depression of one of which is necessary to release the machine, and to so combine with this key bank the totalizer control mechanism that when certain of the special transaction keys are depressed no amount will be accumulated on the totalizer even though an amount may be set up on the amount key banks.

A further object is to provide the special transaction key bank with a novel interlocking mechanism so associated with certain of the keys that it prevents a depression of two of such keys simultaneously.

A still further object of this invention is to provide a novel timing of the engagement of the totalizer mechanism and its actuating racks.

With these and incidental objects in view, the invention consists in certain novel features of construction and combinations of parts, the essential elements of which are set forth in the appended claims, and a preferred form of embodiment of which is hereafter described with reference to the drawings which accompany and form part of the specification.

In the accompanying drawings.

Figure 12:
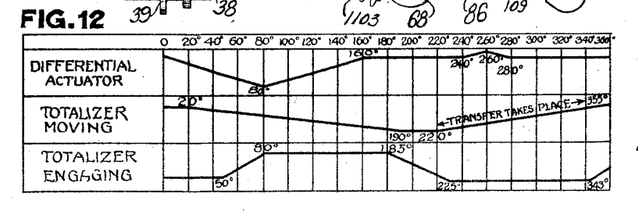
Fig. 12 shows the timing of the actuators, and the totalizer moving and engaging mechanisms.

Described in general terms, this machine may be said to comprise a series of key banks for the amounts to be registered and a single key bank for the different classes of transactions. When any of the keys in the various banks are operated through a differential mechanism hereafter to be described, vertical rack bars are set up which position rotary indicators. In the structure illustrated in the above noted Carroll patents, after the rack bars had been positioned by the setting levers the totalizer was drawn over them by an operation of the crank handle. In the present machine, however, where a keyboard is used in place of the setting levers, the totalizer is drawn over the vertical racks during the time in which the racks are being positioned and is not held stationary until the racks are set. The timing is such, however, that the rack bars are brought to a stop in their set positions before the totalizer is disengaged therefrom to prevent overthrow of the totalizer. The timing for these parts is shown in Fig. 12. The keys of the special transaction bank are four in number designated. "Cash," "Rc. Acct.", "Charge" and "Pd. Out", and are the release keys for the machine, a depression of one of them being necessary to unlock the operating handle. The totalizer control is so combined with this key bank that when either the key designated "Cash" or "Rc. Acct." is depressed the amount set up on the amount banks will be accumulated on the totalizer; but when either the "Charge" or "Pd. Out" key is depressed the amount set up on the amount banks will not be accumulated on the totalizer. The purpose of this arrangement is obvious, since the amount of money in the cash drawer at the close of a day should balance with the amount shown on the totalizer, a result not possible should the amounts of "charge" and "paid out" transactions be accumulated on the totalizer. An interlocking mechanism is applied to the special transaction bank and is so associated with certain of the keys that it prevents a depression of two of such keys simultaneously.

It is not thought necessary to go into a detail description of the totalizing mechanism and numerous other parts of the machine not having any direct bearing in the present improvements, as these parts are fully described in United States patents to T. Carroll 751,611 dated Feb. 9, 1904, and 773,053 dated Oct. 25, 1904, before mentioned.

The totalizer.

Figures 4, 5:
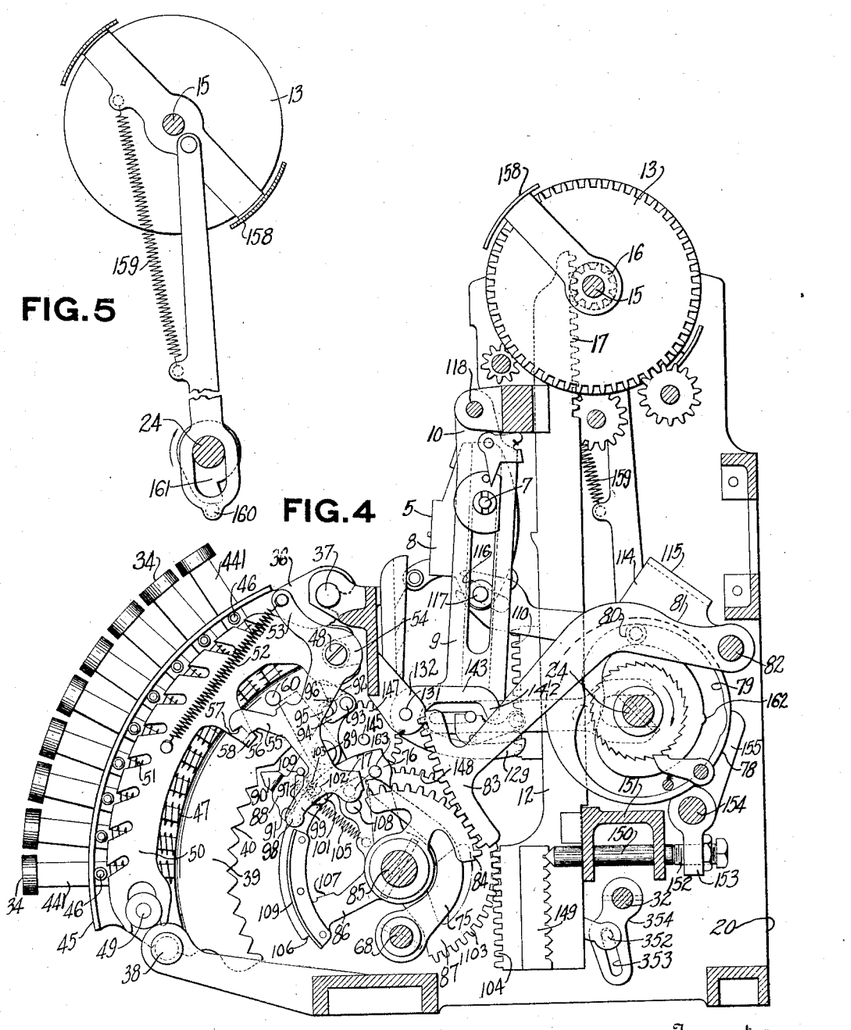
Figure 4 is a vertical sectional view taken on the line 4—4 of Figure 1, looking in the direction indicated by the arrows.
Figure 5 is a detail view of the flash control mechanism.
Figures 6, 7:
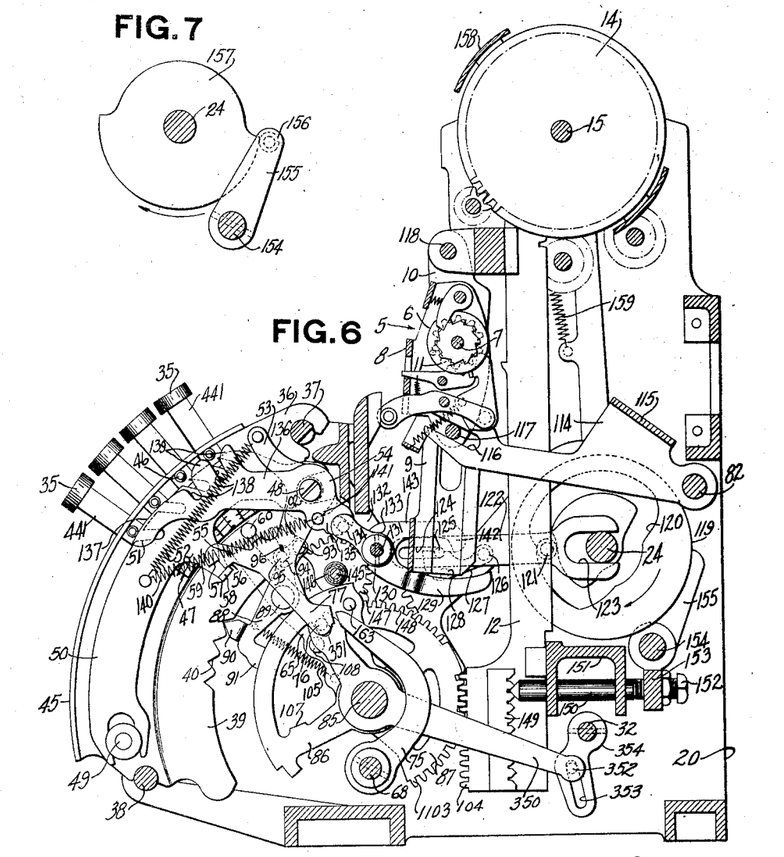
Figure 6 is a vertical sectional view taken on the line 6—6 of Figure 1, looking in the direction indicated by the arrows.
Figure 7 is a detail view of the cam for actuating the aliner for the racks.

It is thought sufficient to state in the present specification that the totalizer 5, referring to Figs. 4 and 6, comprises a series of rotary totalizing wheels 6, mounted on a rotary shaft 7, which in turn is mounted in a slidable totalizer frame 8. This frame is mounted to reciprocate vertically in slotted side arms 9 of a rocking frame 10, which latter is actuated to move the totalizer wheel pinions 11 into and out of mesh with vertically reciprocating rack bars 12, as will hereinafter be more fully described. It is sufficient here to state that the totalizer-wheels are set by a movement of their associated racks which are actuated commensurate with the keys depressed. It will of course be understood that the totalizer-wheels may be arranged for any monetary system; but in the present instance and to illustrate one application of the invention they are shown constructed for United States currency with the denominations of cents and dollars. The construction and operation of the totalizer-wheels 6 together with their cooperating transfer mechanism are identical with that shown and described in the above noted patents to Carroll Nos. 751,611 and 773,053 and as a consequence this description will not be repeated here.

The indicators.

The indicator wheels 13 for the amounts and the wheels 14 for special transactions are rotatably mounted upon a shaft 15 and arranged in two sets for indicating at the back and front of the machine. These sets are geared together, so as to read correctly from left to right upon both sides of the machine by connecting shafts and pinions and in a manner well known to those skilled in the art. Each of the wheels 13 and one wheel 14 which are arranged to indicate at the front of the machine, are provided with toothed hubs 16 fast on the wheels and meshing with teeth 17 on the vertically reciprocable racks 12 whereby they are set, as hereafter to be described, by a movement of their associated racks which are actuated commensurate with the keys depressed.

The operating mechanism.

Figure 1:
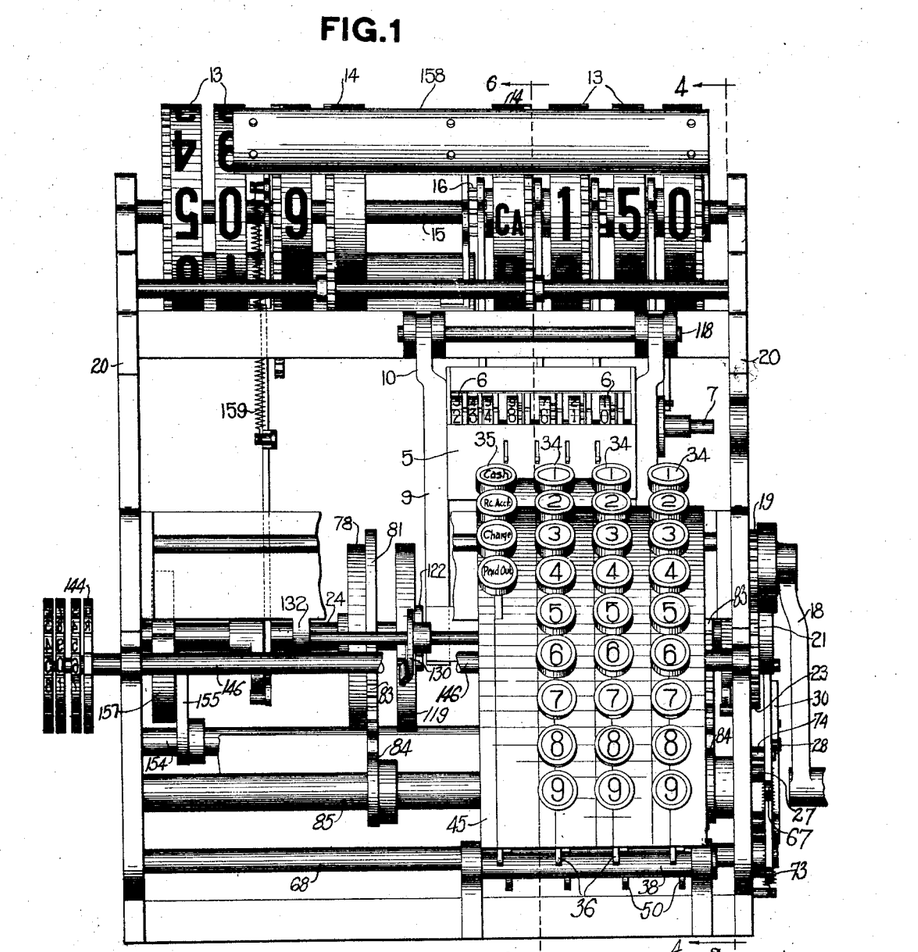
Figure 1 is a front elevation of a machine embodying the invention, the cabinet of the same and cash drawer being omitted and the handle broken away.
Figures 2, 3:
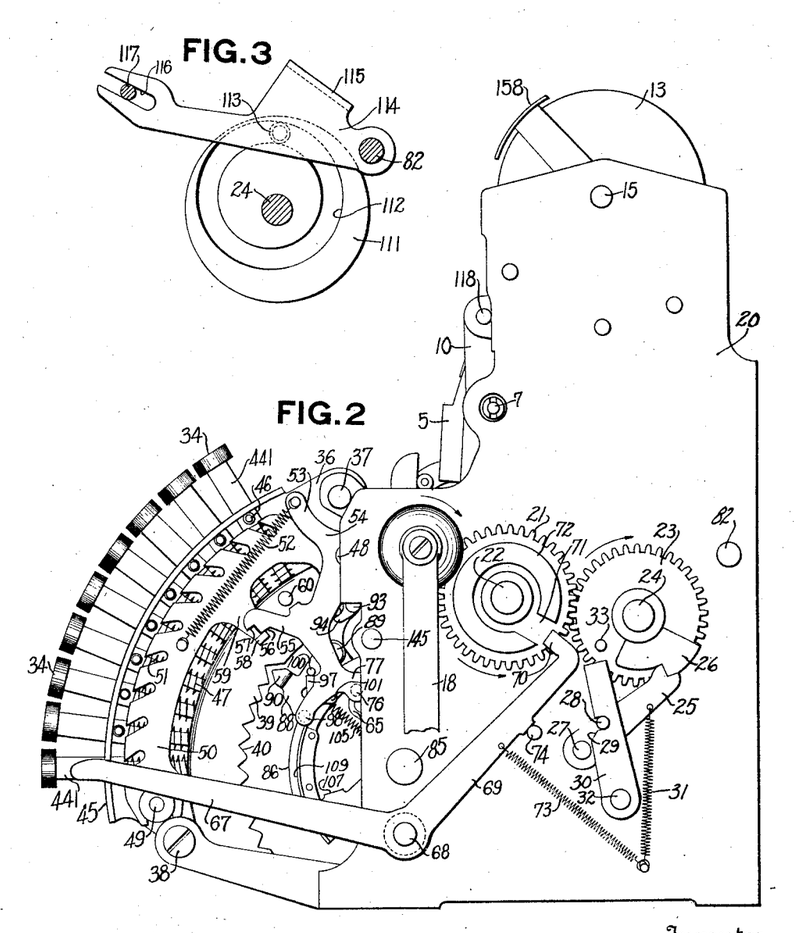
Figure 2 is a side elevation of the machine illustrated in Figure 1.
Figure 3 is a detail view of the totalizer actuating arms.

The driving means for the machine illustrated herein comprises a crank handle 18, referring to Figures 1 and 2, carrying a pinion 19, having a recess in its center (not shown) to receive a stud (not shown) carried by one of two parallel side frames 20. The pinion 19 meshes with a gear 21 rotatably mounted on a stud 22 carried by the side frame 20, which gear meshes with a gear 23 fast upon a shaft 24 which carries the entire cam line for actuating all of the elements of the machine. The shaft 24 is normally locked against rotation by means of a pawl 25 engaging a cam surface on a block 26 fast on the gear 23. The pawl 25 is loosely mounted on a stud 27 and carries a pin 28 held in a notch 29 made in the side of an arm 30 by a coil spring 31. The arm 30 is fast upon a shaft 32 having bearings in the side frames 20 and rocked by a depression of any of the keys in the special transaction bank as will be hereinafter described. The rocking of the arm 30 clockwise permits the pawl 25 to drop assisted by its spring 31 when the gear 23 is given a slight movement counter-clockwise. A counter-clockwise movement of the gear 23 is necessitated by the shape of the notch in the pawl 25. During the completion of the operation of the machine a pin 33 carried by the gear 23 engages the rear edge of the arm 30 and rocks it counter-clockwise, restoring the pawl 25 to its normal locking position with respect to the cam surface on the block 26.

The keyboard.

The keyboard, referring to Figure 1, comprises three banks of amount keys 34 and one bank of special transaction keys 35. The keys of each bank are mounted in an individual key frame 36 (Figures 2, 4 and 6) mounted on cross rods 37 and 38 the openings in the key frames to receive the said rods being of such a shape that by turning the rod 37 the banks are either locked in place or released for removal, this removable key frame construction being well known to those skilled in the art. The key frames 36 are stamped and shaped from sheet metal resulting in much cheaper and lighter frames than those which are either cast or assembled from several parts. Heretofore, latch plates have been made separate and attached to the key frames, whereas in the present construction each key frame 36 has integral therewith a latch plate 39 having the usual looking notches 40 which however are cut at points considerably removed from the key shanks with which they cooperate, the purpose of which will be hereinafter described.

Figure 8:
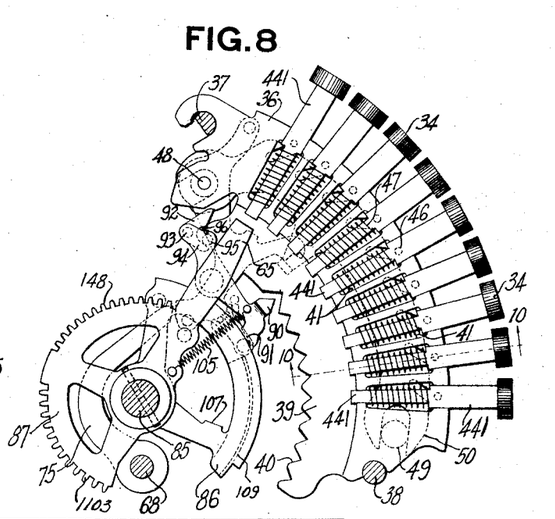
Figure 8 is a detail view of an amount bank and its associated differential mechanism shown in left side elevation.
Figure 9:
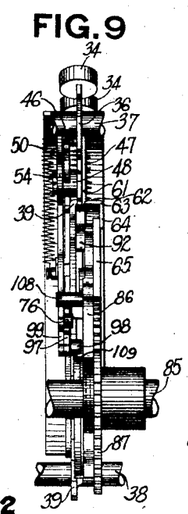
Figure 9 is a rear elevation of the mechanism illustrated in Figure 8.
Figure 10:
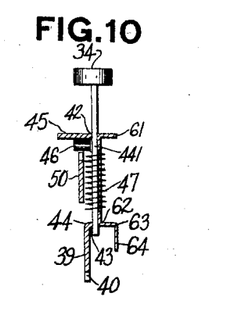
Figure 10 is a vertical sectional view taken on the line 10—10 of Figure 8, looking in the direction indicated by the arrows.

In the manufacture of the key frame 36 the body portion is blanked out with nine openings 41, referring to Figures 8, 9 and 10, and formed with right angle bends at 42 and 43 to form slots to receive the key shanks 441 of the keys. The lateral wall 45 formed by the bend at 42, forms the top wall of the key frame and the lower end of the blank is again bent at 44 to form the latch plate 39 which extends in a plane parallel to the body portion of the key frame. The space between the bends at 43 and 44 is sufficient to space the key shank from the latch plate 39 and prevent friction between these parts. The key shanks 441 have transverse pins 46 which are normally held in engagement with the under surface of the top wall 45 of the key frame by coil springs 47 surrounding the key shanks and compressed between shoulders formed on the shanks and the bottom walls of the openings 41.

Each key frame 36 is provided on its inner face with two projecting studs, one stud 48 fastened to the frame adjacent its top and the other stud 49 fastened thereto adjacent its bottom. These studs receive the slotted ends of a detent 50 having a curved upper edge provided with a plurality of inclined slots 51 each cooperating with a pin 46 carried by each key shank 441. A coil spring 52 is stretched between the detent and one arm 53 of a three armed lever 54 which is pivotally mounted upon the stud 48. Another arm 55 of the lever 54 has two stepped shoulders 56 and 57 formed adjacent its outer end which are one at a time held in contact by the coil spring 52 with a laterally extending lip 58 carried by a downwardly extending arm 59 integral with the detent 50. The parts are shown in their normal positions in Figures 2, 4 and 6 which they occupy before a key is depressed and in which positions the shoulder 56 is in contact with the lip 58 thereby permitting the spring 52 to hold the slots 51 of the detent 50 in such a position that all the pins 46 carried by the key shanks 441 are free to enter them upon being depressed. A depression of a key will cause the pin 46 carried by the shank thereof to ride upon the inclined edge of its associated slot 51 and slide the detent 50 downwardly. The downward movement of the detent will dislodge the shoulder 56 of the arm 55 from the lip 58 of the detent 50 and lodge the shoulder 57 of the said arm upon the lip thereby locking the detent in its lowered position, the lever 55 being rocked counter-clockwise by the tension of the spring 52. The detent 50 in its locked position will retain the depressed key in its depressed position and also present its curved edge beneath all the pins 46 of the undepressed keys and the slots 51 out of register with the pins 46 carried by those keys, thus preventing a depression of any of them until the machine has nearly completed its operation at which time the lever 55 will be rocked clockwise, by means hereinafter to be described, permitting the detent 50 to return to its normal position and at the same time releasing the depressed keys, the clockwise movement of the lever 55 being limited by engagement with a pin 60 carried by the latch plate 39.

The key shanks 441 are held within the slots made in the frame by a key cover 61, referring to Figs. 9 and 10, secured to the key frame by screws (not shown). The key cover is bent at right angles at 62 and 63 to form a flange 64 parallel with but stepped from the body portion of the cover to form a guide for the upper end of an arm 65, the purpose of which will be hereinafter described.

As before explained, when any key in a bank is depressed the detent 50 with which it is associated is moved to both lock the key in its depressed position and also prevent the depression of any other keys in the bank. However, should a key be depressed by mistake and the error discovered before the machine is operated means is provided for restoring the detent to its normal position and releasing the key. This means, referring to Figures 2 and 6, comprises a hand operated lever 67 fast upon a shaft 68 rotatably supported in bearings made in the side frames 20. The lever 67 is extended beyond the shaft 68 to form an arm 69 which extends upwardly and terminates in a portion 70 bent at substantially right angles thereto and movable, when the lever 67 is depressed, into and out of a slot 71 made in an annular boss 72 secured to the side of the gear 21. A coil spring 73 stretched between the arm 69 and a stud carried by the side frame 20 normally holds the arm 69 against a stud 74 secured to the side frame 20, in which position the portion 70 of the said arm is outside of the notch 71 of the boss 72. Fast upon the shaft 68 are curved arms 75 one for each key bank, the upper end of which cooperates with a stud 76 carried by the third arm 77 of the three armed lever 54. Should a key in a bank be depressed and it is desired to release it, the lever 67 is depressed, which through the shaft 68 rocks the levers 75 counter-clockwise, so that they engage the studs 76 carried by the arms 77 and rock them clockwise, which movement lifts the arms 55 (permitted to descend by the depression of the keys) and permits the detents 50 to return to their normal positions thus releasing the keys as has been previously described. It is to be understood that even though but a key in one bank should be wrongly depressed, keys which might have been correctly depressed in other banks would all be simultaneously released by moving the lever 67. This construction necessitates an entire re-operation of all the keys to set up the amount desired which is more conducive to accuracy than where the keys wrongly depressed could be corrected separately.

Before the machine is operated the gear 21 and arm 69 always occupy the position shown in Figure 2 in which the lever 67 may be moved to release any depressed keys, the projection 70 of the arm having free passage through the slot 71 in the boss 72. When, however, the machine has been operated, the notch 71 of the boss has been rotated out of registry with the projection 70 of the lever 67 preventing its movement to release any keys during the operation of the machine, the projection 70 abutting against the boss 72 should the lever 67 be moved.

The keys 35 of the special transaction key bank are connected to the release mechanism for the machine, consisting of the rockable shaft 32 which releases the locking pawls 25 and 30 previously described, so that a depression of one of the special transaction keys is necessary before the machine may be operated. The means for rocking the shaft 32 to release the machine by a depression of one of the keys 35, referring to Figure 6, comprises a lever 350 loosely mounted upon a shaft 85, the upper end of the lever being forked at 351 to receive the pin 76 which is extended longer than those pins 76 which are used with the amount banks. The lower end of the lever 350 is provided with a pin 352 fitting within a slot 353 in a lever 354 fast upon the shaft 32. When one of the keys 35 is depressed, the three armed lever 54 is rocked counter-clockwise as previously described, which movement through the pin 76 carried by the arm 77 of the said lever and slot 351 in the lever 350, moves the lower end of the said lever 350 downwardly. The downward movement of the lever 350 through its pin and slot connection with the arm 354 rocks the shaft 32 clockwise releasing the locking pawls 25 and 30 as previously described.

*The differential mechanism.*

To drive the differential mechanism of the machine the shaft 24 is provided with two cams 78, referring to Figures 1 and 4, located at opposite sides of the keyboard. These cams have grooves 79 to receive rollers 80 carried by levers 81 loosely mounted on a shaft 82, which levers extend forwardly and downwardly and are formed into toothed segments 83 meshing with toothed segments 84 fast upon a shaft 85 rotatably mounted in bearings carried by the side frames 20.

The shaft 24 as previously described is rotated when the crank handle 18 is operated. As a consequence, through the mechanism above described the shaft 85 is oscillated once back and forth during an operation of the crank handle.

Fast upon the shaft 85 are actuating segments 86 one opposite each key bank and oscillated by the actuation of the segments 83 and 84. Loose upon the shaft 85 are differential segments 87 terminating in the radially extending arms 65 previously mentioned. The segments 86 are arranged between the segments 84 and 87 as is clearly shown in Figure 4.

A latch lever 88 is pivoted at 89 to each arm 65, which latch lever has on its lower end a tooth 90 cooperating with the teeth 40 of the latch plate 39 and a foot 91 adapted to slide upon the peripheral edge of the actuating segment 86. A pawl 92 is pivoted at 93 to the upper end of the latch lever 88 and has a tail 94 normally held in engagement with a stud 95, carried by the lever, by a spring 96 compressed between the stud and the nose of the pawl due to which construction the said pawl may be rocked counter-clockwise but not clockwise, (Fig. 4) the purpose of which will be hereinafter explained.

When the parts are in their normal home positions, as is illustrated in Figure 4, the latch lever 88 is held supported so that its foot 91 is spaced from the peripheral edge of the actuating segment 86 by means of a pawl 97, pivoted to a stud 98 carried by a downward extension 99 of the arm 77, engaging a stud 100 carried by the latch lever 88. The pawl 97 has a tail 101 held in engagement with a stud 102, carried by the extension 98, by a spring 103 compressed between the stud and the pawl due to which construction the said pawl may be rocked clockwise for a purpose hereafter to be described but prevented from being rocked counter-clockwise so that it may support the lever 88 by engaging the stud 100 carried thereby.

The latch lever 88 provides means for locking the differential segment 87, loose upon the shaft 85, to the actuating segment 86 fast upon the said shaft so that it may be oscillated when the shaft is actuated. The segment 87 is provided with teeth 1103 meshing with teeth 104 formed on the rack 12 the movement of which actuates the totalizer and sets the indicators as will be hereinafter explained. The extent of movement of the segments 87 is determined by the key depressed, as will now be described, so that through the said segments the racks 12 are actuated commensurate with the key depressed.

Referring now particularly to Figures 2 and 4, when a key 34 is depressed, the pin 46 carried by the shank of the key will engage the inclined notch 51 associated therewith and slide the detent 50 downwardly against the tension of the spring 52. This movement of the detent will release the arm 55 of the lever 54 and permit the said lever to rock counter-clockwise under action of the spring 52. This movement of the lever 54 will lower the extension 99 of the said lever a distance sufficient to disengage the pawl 97 from the stud 100 carried by the latch lever 88 and permit the foot 91 of the lever 88 to be drawn down into engagement with the peripheral edge of the actuating segment 86 by a coil spring 105 stretched between the latch lever 88 and the said segment.

Upon operation of the crank handle, through the medium of cams 78, segments 83 and 84 and shaft 85, the segments 86 are first oscillated clockwise. As previously described, a depressed key permits the foot 91 of the latch lever 88 to rest upon the peripheral edge of its associated segment 86 so that as the segment nears the completion of its clockwise movement the foot 91 of the latch lever 88 will be drawn downwardly by the spring 105 behind a shoulder 106 made in the periphery of the segment. The downward or counter-clockwise rocking of the latch lever 88 is sufficient to disengage the tooth 90 of the said lever from the notch 40 with which it was in engagement, so that upon further movement of the crank handle to oscillate the segment 86 counter-clockwise the latch lever 88 will be free from the latch plate 39 and may be carried downwardly with the segment 86, the foot 91 of the latch lever being in engagement with the shoulder 106. The latch lever 88 will be carried downwardly with the segment 86, until the pawl 92 carried by the lever engages the shank of the key depressed at which time the said latch lever 88 will be rocked clockwise a distance sufficient to disengage its foot 91 from the shoulder 106 and restore the said foot to its position upon the peripheral edge of the segment 86, thus disconnecting the latch lever and segment so that the latter is free to move to the limit of its downward movement. Simultaneous with the restoring of the foot 91 to its position on the peripheral edge of the segment 86, the tooth 90 is moved into and locked in one of the notches 40 of the latch plate 39 so that the lever 88 and differential segment 87 are left latched in a position determined by the key depressed. The counter-clockwise movement of the segment 87 during the time of its connection to the segment 86 by the latch lever 88 moves the rack 12 geared to the said segment 87 a distance to both actuate the totalizer and set the indicators commensurate with the key depressed.

The foregoing description of the operation of the differential mechanism was given starting with the parts in the positions shown in Figures 2 and 4 which they would occupy had no keys been depressed during the previous operation. However, referring again to the said figures, had keys been depressed in the key banks there illustrated during the previous operation and keys are again depressed for another operation, the functions of the parts during this second operation would be as follows:

The segments 86 are first oscillated clockwise by a movement of the crank handle, as was previously described, and during this operation as the shoulder 106 of each segment reaches the foot 91 of the associated latch lever 88 the said foot is drawn downwardly by the spring 105 a distance sufficient to disengage the tooth 90 of the latch lever from the teeth of the latch plate 39. At about the same time the latch lever is released an abutment 107 formed on the segment 86 engages a pin 108 carried by the segment 87 through which engagement the segment 87 and its latch lever 88 are oscillated clockwise. Should the key depressed for this operation be above the pawl 92 carried by the latch lever, during the upward movement of the latch lever, this pawl would not set up an interference with the shank of the depressed key but merely be rocked counter-clockwise, the tail 94 of the pawl only serving to hold it rigid during an attempted clockwise rotation of it. On the counter clockwise oscillation of the segment 86 to its home position the segment 87 will be unlatched therefrom upon engagement of the pawl 92 with the shank of the key depressed in the same manner as previously described. Attention is called to the fact that in this operation the segments 87 are first carried to their normal positions in which they set their associated indicators to zero before they are moved to their new positions determined by the keys depressed.

In a case wherein keys were depressed during the previous operation but no keys are depressed in the banks illustrated in Figures 2 and 4 in the following operation the functions of the parts are as follows:

The clockwise movements of the segments 86 unlatch the segments 87 by means of their latch levers as previously described and through the abutments 107 and studs 108 oscillate the said segments and latch levers clockwise. As the latch lever 88 nears its home position the pin 100 carried thereby rides over the nose of the pawl 97 and the pawl snaps beneath the said pin holding it and the latch lever 88 in the position shown in Figures 2 and 4 in which the foot 91 thereof is above the peripheral edge of the segment 86 and the foot 91 of the latch lever is removed from the shoulder 106 of the segment 86 thus breaking the latch between the segment 87 and segment 86. If no key in the bank is depressed the position of the three armed lever 54 is not disturbed but upon the counter-clockwise movement of the segment 86 the segment 87 is left in its zero position. The tenth or uppermost notch 40 of the latch plate 39 is made larger as illustrated permitting the gradual outward movement of the latch lever 88 through the riding of the pin 100 on the pawl 97 in releasing the latch from the segment 87.

During every operation of the machine irrespective of whether any keys have been depressed or not during the previous operation, means is provided during the counter-clockwise movement of the segments 86 to home position to rock the levers 54 clockwise a distance sufficient to raise the arms 55 and permit the detents 50 to return to their normal positions and thereby releasing any keys which have been depressed. This means, referring to Figures 4 and 6, comprises a high spot 162 formed on each cam groove 79, which shortly after the segment 86 has reached the limit of its counter clockwise movement, engages the anti-friction roller 80 carried by the arm 81 lifting it and oscillating the segment 86 counter-clockwise a short distance past its home position. This movement of the segment 86 is sufficient to bring a stud 163 carried thereby into engagement with the end of the arm 77 of the lever 54 and rock the said lever clockwise a distance sufficient to free the detent 50 and permit it to return to its normal position. Movement of the detent 50 to its home position, as previously described, releases any depressed keys. As the anti-friction roller 80 clears the high spot 162 of the cam 78 during the further actuation thereof, the arm 81 is rocked downwardly to its normal position, the movement of the arm also restoring the segment 86 to its normal home position in which the pin 163 is out of contact with the arm 77 of the lever 54 as is shown in Figures 4 and 6 above referred to.

If a key in the bank has been depressed on the previous operation the arm 99 of the lever 54 has been lowered sufficient to position the pawl 97 out of the path of the pin 100 so that in the succeeding operation no breaking of the latch at zero position occurs.

Since one of the keys 35 in the special transaction bank, referring to Figure 6, is always depressed, these keys being release keys, there is never any need of breaking the differential latch at zero. As a consequence the three armed lever 54 is not provided with a pawl 97 as are the different mechanisms cooperating with the amount banks previously described.

In order to provide a positive lock for the amount key banks during the operation of the machine in addition to the locking mechanism described in connection with the keyboard, the segments 86 are each provided with an outstanding flange 109 secured thereto (Figures 2 and 4). When a key 34 in the bank is depressed the extension 99 of the three armed lever 54 is dropped as previously described. This downward movement of the lever is sufficient to move the stud 98 carried thereby into a position where it will ride beneath the outstanding flange 109 carried by by the segment 86 during both the clockwise and counter-clockwise movement of the said segment. When the stud 98 is in this position the arm 55 is locked firmly against the lip 58 of the detent 50 and prevents its movement thus preventing the depression of a key. If no key in the bank is depressed the arm 99 of the lever 54 is not lowered and therefore during the oscillations of the segment 86 the stud 98 rides upon the upper surface of the outstanding flange 109. When the stud is in this position the lever 54 will be held in its normal elevated position even though a key should be depressed, the lever being supported by the stud 98 and not by the lip 58 of the detent 50. As a consequence during the operation of the machine should a key be depressed the arm 54 would not be rocked counter-clockwise to lower the pawl 97 and move the latch lever 88 into a position to latch the segments 86 and 87 together.

Since a key 35 in the special transaction bank is always depressed there is no need for the locking means above described and therefore none is provided for the bank.

Totalizer control mechanism.

Figure 11:
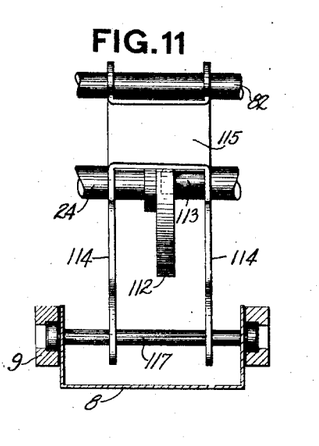
Figure 11 is a detail view in top plan of the totalizer actuating arms illustrated in Figure 3.

During the operation of the crank handle and while the racks 12 are being set by the differential mechanism in positions commensurate with the keys depressed, the gear wheels 11 of the totalizer are brought in mesh with teeth 110, formed on the racks 12, referring to Figures 4 and 6, so that they may be set thereby. The totalizer 5 is shown in its normal position in these figures and from this normal position it is first rocked into position to engage the gear wheels thereof with the racks as it is drawn downwardly over the racks as is described in detail in the Carroll patents above mentioned. The totalizer actuating mechanism of the present machine is similar to that shown and described in the Carroll patents. The means for drawing the totalizer over the teeth of the racks after it has been rocked into engaging position comprises, referring to Figures 3, 4 and 11, a cam 111 fast upon the shaft 24, and having a cam groove 112 to receive an anti-friction roller 113 carried by one of two arms 114 which are joined by a bail 115, both arms being loose upon the shaft 82. The forward ends of the arms 114 are slotted at 116 to receive a transverse bar 117 carried by the totalizer frame 8. By this means when the shaft 24 is rotated, as hereinbefore described, the arms 114 are oscillated, and the totalizer thus given its movements first down and then back to its upper normal position. The transferring devices are operated upon the back or up stroke; but as their particular construction forms no part of the present invention no further description of them is thought to be necessary. It will of course be understood that the frame 9 in which the totalizer slides is shown in Figure 4 in a position in which the totalizer would not engage any of the rack teeth. It is thus necessary to first rock the frame 9 rearward at its lower end, it being pivoted at 118 to the main frame.

The means for rocking the totalizer into position to engage the racks as it is moved downwardly is controlled from the keys of the special transaction bank. There are four keys in this bank designated "Cash," "Rc. Acct.," "Charge" and "Pd. Out." The totalizer control mechanism is so combined with this key bank that when either the key designated "Cash" or "Rc. Acct." is depressed the amount set up on the amount banks will be accumulated on the totalizer; but when either the "Charge" or "Pd. Out" key is depressed the amount banks will not be accumulated on the totalizer. The purpose of this arrangement is obvious, since the amount of money in the cash drawer at the close of a day should balance with the amount shown on the totalizer, a result not possible should the amounts of "Charge" and "Pd. Out" transactions be accumulated on the totalizer. This control mechanism, referring to Figure 6, comprises two cams 119 fast to the shaft 24 and having cam grooves 120 to receive anti-friction rollers 121 carried by pitmans 122 the rear ends of which are slotted at 123 to straddle the shaft 24. The forward end of each pitman 122 is provided with a longitudinal slot 124 to receive a pin 125 one of which projects from the side of each slotted side arm 9. Each of the pitmans 122 has pivoted thereto at 126 a pawl 127 having a cut out portion on its upper edge to receive the pin 125 and a pin 128 on its lower edge which is normally in engagement with the upper edge of one arm 129 of an approximately U-shaped lever 130 which is fast upon a shaft 131 rotatably mounted in bearings made in ears 132 depending from the framework. Also fast upon the shaft 131 is an arm 133 the upper end of which carries a pin 134 which fits within the slotted end of a projecting arm 135 of a detent plate 136 which is pivotally mounted upon the stud 48. The detent has an unbroken peripheral edge 137 projecting beneath the pins 46 of the "Charge" key and "Pd. Out" key and is also provided with two slots 138 one directly beneath each pin 46 of the "Cash" key and "Rc. Acct." key. The detent between the slots 138 is projected slightly to form fingers 139 the purpose of which will be hereinafter explained. A coil spring 140 stretched between a stud 141 carried by the projecting arm 135, and the detent 50 serves to hold the detent plate 136 in its normal position as illustrated in Figure 6. In this normal position of the parts the levers 129 engaging the pins 128 force the pawls 127 upwardly so that the cut out portions in their upper edges embrace the pins 125. The pawls in this position latch the pitmans 122 to the side arms 9 of the totalizer-frame so that during the operation of the machine when the pitmans are reciprocated by the cams 119 the gear wheels of the totalizer are brought into position to mesh with the teeth 110 on the racks 12 so that they are set thereby. Should either of the keys 35 marked "Cash" or "Rc. Acct.," which are the two upper keys shown in Fig. 6, be depressed, the pin 46 carried by the shank thereof will enter its associated slot 138 in the detent plate 136 and not disturb the plate and consequently not unlatch the pitman 122 from the side arms 9 of the totalizer-frame. From this it will be seen that when either the "Cash" or "Rc. Acct." key is depressed the amount set on the racks by the differential mechanism will be accumulated on the totalizer. Should, however, either of the two lower keys 35 illustrated in Figure 6, which are marked "Chg." and "Pd. Out" be depressed, the pin 46 carried by its shank 441 will engage the unbroken peripheral edge 137 of the detent plate 136 and rock this plate counter-clockwise. The counter-clockwise movement of the plate 136 will through the link 133 lower the arm 129 of each U-shaped lever 130 and bring a hooked end 142 of each other arm 143 of the U-shaped levers 130 into engagement with the upper edge of the pawls 127 and move these pawls downwardly a distance sufficient to free the pins 125. When the pitmans 122 are subsequently reciprocated during the operation of the machine they will slide idly back and forth the edges of the slots 124 thereof resting upon the pins 125, but will not rock the totalizer into position to engage with the racks 12. From this it will be seen that when either the "Chg." or "Pd. Out" key is depressed the amount set on the racks by the differential mechanism will not be accumulated on the totalizer.

Attention is here called to the fact that whereas in the mechanisms illustrated in the above mentioned Carroll patents the racks 12 were brought to a stop before the totalizer was rocked into position to engage with and be drawn over the teeth thereof; in the present machine the grooves in the cams controlling the operation of the totalizer are such that the totalizer is brought into position to engage with the racks and be drawn down over the teeth 110 thereof while the racks 12 are still being moved upwardly under the action of the differential mechanisms. The cams are so shaped however that the totalizer is not disengaged from the racks until they have come to a stop in their upward movement which timing is provided to prevent overthrow of the totalizer wheels which might otherwise occur.

Interlocking mechanism.

Means is provided for preventing a simultaneous depression of either one of the special transaction keys 35 marked "Cash" or "Re. Acct." with either of these keys marked "Chg." or "Pd. Out." As an example, should the "Pd. Out" key and the "Cash" key be simultaneously depressed, since the differential segment 87 rocks counter-clockwise to position the racks 12, the latch 88 would first encounter the "Cash" key and be broken thereby, setting the indicators to show a cash sale and also setting the type wheels to print cash on the detail strip and receipt as will be hereinafter explained. The depression of the "Pd. Out" key however unlatches the totalizer engaging pitmans 122 from the totalizer frames 9 so that although a cash sale is indicated and printed the amount thereof will not be accumulated on the totalizer. To overcome this difficulty as before stated, an interlocking mechanism is provided preventing such a manipulation of the keys. This interlocking mechanism, referring to Figure 6, comprises the fingers 139 on the detent plate 136. Should either of the keys 35 whose pins 46 lie above the peripheral edge 137 of the detent plate 136 be pressed simultaneously with either of the keys 35 whose pins 46 cooperate with the slots 138, the detent plate would be wedged, the finger 139 engaging the pin 46 of one key and the peripheral edge 137 engaging the pin 46 of the other. Should the keys be depressed separately, the operation of the detent 50 by one key would lock the other key in the usual manner.

The printing mechanism.

The printing devices which are used with the present mechanism are the same as are fully illustrated and described in the before mentioned Carroll Patent 751,611, and as a consequence a full description of this mechanism will not be given herein but only the connection thereof with the operating elements of the machine. Referring to Figures 1 and 4, a plurality of type wheels 144 are secured to a shaft 145 and nested sleeves 146. The said shaft and sleeves carry on their inner ends segments 147 meshing with teeth 148 made on the peripheral edge of the differential segments 87. From the foregoing it is apparent that when the said segments are differentially positioned by the depressed keys the amount represented by the said keys will be set upon the type wheels and subsequently printed upon the detail strip and check as is fully shown and described in the aforementioned Carrol patent.

Alining device.

In order to assure that both the racks 12 and differential segments 87 are properly positioned to correctly actuate the totalizer and correctly set both the indicator and type wheels an alining mechanism is provided. This mechanism referring to Figures 4, 6 and 7 comprises toothed plates 149 secured to the rack bars 12 cooperating with each of which is a sliding plunger 150 having its end pointed to fit with the teeth of the plate 149. Each plunger 150 is reciprocable in guides 151 carried by the framework. Bearing against the outer end of each plunger is an adjustable bolt 152 carried in the end of an arm 153 fast upon a shaft 154 rotatably mounted within bearings carried by the side frames 20. Also fast upon the shaft 154 is an arm 155 carrying upon its outer end an anti-friction roller 156 riding upon the periphery of a cam 157 pinned to the shaft 24.

Just after the racks 12 have reached the limit of their upward movement and just previous to the disengagement of the totalizer gears 11 from the teeth 110 thereof, the roller 156 carried by the arm 155 engages the high portion of the cam 157 and rocks said arm clockwise. The clockwise movement of the arm 155 rocks the shaft 154 and arm 153 in the same direction and through the engagement of the bolt 152, carried by the lever 153, with the end of the plunger 150 forces the pointed end of the said plunger into the adjacent tooth of the plate 149. This movement of the plunger adjusts the racks 12 and segments 87 to their correct positions and retains them therein until the beginning of the next operation of the machine when the cam 157 permits the arm 155 to rock free and release the plunger 150 from the teeth of the plate 149.

*The flash mechanism.*

The flash mechanism used with the present machine is the same as that shown and described in U. S. patent to Church 1,005,601 dated Oct. 10, 1911, so that but a brief description thereof will be given here.

Referring to Figures 5 and 6, the flash 158 is immediately drawn over the exposed indicators at the starting of the operating crank by a spring 159. The release of the spring 159 is effected by a roller 160 being drawn into the cut away portions of a cam 161 fast upon the shaft 24. The cam 161 returns the flash 158 to normal position at the end of each operation of the machine.

As the cash register to which the present invention is applied in the illustrated form disclosed herein is well known in the art and disclosed in the above mentioned patents, and as the device of the present invention is simple and has been fully described above it is thought unnecessary to give a résumé of the complete operation of the machine, the foregoing description being considered complete in itself for a perfect understanding of the present invention.

While the form of mechanism herein shown and described, is admirably adapted to fulfill the objects primarily stated, it is to be understood that it is not intended to confine the invention to the one form of embodiment herein shown, for it is susceptible of embodiment in various forms, all coming within the scope of the claims which follow.

What is claimed is:—

1. In a machine of the class described, the combination of a series of adjustable racks, a movable frame carrying a totalizer, operating means for giving said frame a definite movement at each operation of the operating means, means operated by said operating means for adjusting the racks to bring a varying number of teeth thereof into the path of movement of the totalizer, said adjusting means comprising a driving member and a driven member, connections intermediate the driving member and operating means whereby the former is given a constant extent of movement at each operation of the latter, means carried by the driven member and operated by the driving member whereby said driven member is given a variable extent of movement by the driving member and keys controlling the last mentioned means.

2. In a machine of the class described, the combination of a series of differentially adjustable racks, a movable frame carrying a totalizer, operating means for giving said frame a definite movement at each operation of the operating means, means operated by said operating means for adjusting the racks to bring a varying number of teeth thereof into the path of movement of the totalizer, said adjusting means comprising a driving member and a driven member, connections intermediate the driving member and operating means whereby the former is given a constant extent of movement at each operation of the latter, keys, latching means carried by the driven member and controlled by said keys whereby said driven member is given a variable extent of movement by the driving member.

3. In a machine of the class described, the combination of an operating mechanism, a series of racks, devices positively actuated by said operating mechanism for setting the racks according to the values to be registered, said devices comprising a driving member and a driven member, a latch device carried by said driven member for operatively connecting the driven member to the driving member, a series of keys cooperating with said latch device whereby the driven member may be given a varying movement by the constant movement of the driving member, a totalizer arranged to be moved over the racks and thereby operated, means operated by the operating mechanism for giving said totalizer a definite movement, and means intermediate the driving member and the operating mechanism for giving said driving member a constant movement at each operation of the operating mechanism.

4. In a cash register, the combination of a plurality of positively driven differential actuators, rack-bars operated by the same, keys for controlling the movement of the said actuators, indicators geared to said bars, a totalizer comprising a series of wheels having pinions arranged to mesh with said rack-bars, a rock frame supporting said totalizer, an operating handle, gearing connected to said operating handle for first actuating the rock frame and then moving the rack bars and simultaneously moving the totalizer over the bars in the opposite direction.

5. In a cash register, the combination of a series of longitudinally adjustable racks, a movable frame carrying a series of registering wheels, means for giving the frame a regular excursion at each operation of the machine, differentially movable actuators for moving the said racks longitudinally to bring a varying number of teeth into the path of travel of the register wheels, means for positively driving said actuators, said means comprising segmental members and a latch lever carried by each of said actuators and manipulative devices for controlling the advance movement of said actuators by engaging the latch levers.

6. In a cash register, the combination of a series of longitudinally adjustable racks, a movable frame carrying a series of registering wheels, means for giving the frame a regular excursion at each operation of the machine, differentially movable actuators for moving the said racks longitudinally to bring a varying number of teeth into the path of travel of the register wheels, means for positively driving said actuators, said means comprising segmental members and a latch lever carried by each of said actuators and keys cooperating with said latch lever for controlling the advance movement of said actuators.

7. In a cash register, the combination of an operating mechanism, a series of racks, a totalizer arranged to be operated by being moved over the racks, positively actuated means for adjusting the racks longitudinally to bring a varying number of teeth into the path of movement of the totalizer said means comprising a driving member, a driven member, and a latch device carried by said driven member, keys for controlling the extent of movement of said driven member by cooperating with the latch device, means connected to the operating mechanism for moving the totalizer over the racks, devices also connected to the operating mechanism for moving the totalizer into and out of cooperative relation with the racks, and a series of keys certain of which prevent the operation of said last mentioned devices.

8. In a cash register, the combination of an operating mechanism, a totalizer mounted in a swinging frame, means intermediate the swinging frame and the operating mechanism having one end connected to the frame, a latch device for coupling and uncoupling said means from the frame, a pivoted member for actuating said latch device for actuating the same, and keys for moving said pivoted member.

9. In a cash register, the combination of an operating mechanism, means for locking the said mechanism, a totalizer mounted in a swinging frame, means intermediate the swinging frame and the operating mechanism for actuating the frame, a latch device for coupling and uncoupling said means from the frame, keys for releasing the said locking means and having projections thereon, a pivoted lever for actuating said latch device and arranged beneath the projections of said keys to be operated thereby.

10. In a cash register, the combination of an operating mechanism, means for locking the said mechanism, a totalizer mounted in a swinging frame, means intermediate the swinging frame and the operating mechanism for actuating the frame, a latch device for coupling and uncoupling said means from the frame, keys for releasing the said locking means and having projections thereon, a pivoted lever for actuating said latch device and arranged beneath the projections of the keys to be operated thereby, the said lever having slots to receive the projections of some of the keys whereby all the keys may be operated to release the locking means for the operating mechanism and some of the keys will not actuate the latch device.

11. The combination of an operating mechanism, reciprocatable racks, a totalizer actuated thereby, said totalizer mounted in a swinging frame, oscillating differential segments for actuating said racks, keys for controlling the movement of the said racks, the said segments movable counter-clockwise to differentially position the racks, means intermediate the swinging frame and the operating mechanism for actuating the frame, a latch device for coupling and uncoupling said means from the frame, keys for controlling said latch device, and means for preventing a simultaneous depression of certain of said keys for controlling the latch device, said means comprising an oscillating member connected to said latch device.

12. The combination of an operating mechanism, reciprocatable racks, a totalizer actuated thereby, said totalizer mounted in a swinging frame, oscillating differential segments for actuating said racks, keys for controlling the movement of the said racks, the said segments movable counter-clockwise to differentially position the racks, means intermediate the swinging frame and the operating mechanism for actuating the frame, a latch device for coupling and uncoupling said means from the frame, keys for controlling said latch device, and interlocking mechanism for preventing a simultaneous depression of certain of said keys for controlling the latch device, said interlocking mechanism comprising an oscillating member connected to said latch device and having projections thereon cooperating with said keys.

13. In an accounting device, the combination of a movable rack, a totalizer having a movement relative to said rack to actuate the totalizer, a positively driven actuator, a segment adapted to engage the rack, a latch lever to lock the segment to the actuator, means for normally holding the latch lever in effective position, said holding means comprising a member having a formed foot, and keys for disabling said holding means and differentially positioning the said segment.

14. In an accounting device, the combination of a movable rack, a totalizer having a movement relative to said rack to actuate the totalizer, a positively driven actuator, a segment adapted to engage the rack, a latch lever to lock the segment to the actuator, means for normally holding the latch lever in ineffective position, said means comprising a key-actuated member having a formed foot, and keys for moving said member and projecting into the path of the latch, the said latch being broken by engagement thereof with the depressed key and disconnecting the segment from the actuator.

15. In an accounting device, the combination of a movable rack, a totalizer having movement relative to said rack to actuate the totalizer, a positively driven actuator, a segment adapted to engage the rack, a latch lever to lock the segment to the actuator, keys, a detent actuated by the depression of a key, and the said detent having a formed foot which supports the latch lever in an ineffective position, whereby a movement of the detent under action of a key restores the latch lever to an effective position.

16. In an accounting device, the combination of a movable rack, a totalizer having a movement relative to said rack to actuate the totalizer, a positively driven actuator, a segment adapted to engage the rack, a latch lever carried by the segment and adapted to engage with the actuator for latching the two together, keys, a detent actuated thereby said detent being provided with a formed foot whereby the said latch lever is supported in a position out of engagement with the actuator, and a movement of the detent permitting the latch lever to engage the actuator.

17. In an accounting device, the combination of a movable rack, a totalizer having a movement relative to said rack to actuate the totalizer, a positively driven actuator, a segment adapted to engage the rack, a latch lever carried by the segment and adapted to engage with the actuator for latching the two together, keys, a detent actuated thereby, a trigger having stepped shoulders one of which rests on a portion of said detent thereby holding the latch lever out of engagement with the actuator, and a movement of the detent dropping the trigger whereby the other shoulder engages said portion of the detent and permits the latch lever to engage with the actuator.

18. In an accounting device, the combination of a movable rack, a totalizer having movement relative to said rack to actuate the totalizer, a positively driven actuator, a segment adapted to engage the rack, a latch lever carried by the segment and adapted to engage with the actuator for latching the two together, keys, a detent rocked thereby for holding a depressed key in depressed position, a trigger having stepped shoulders one of which engages said detent and is supported by the detent thereby holding the latch lever out of engagement with the actuator, and a rocking of the detent dropping the trigger and disengaging said shoulder from the detent and causing another shoulder to engage the detent and hold it in rocked position whereby the latch lever is permitted to engage with the actuator.

19. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in depressed position, a trigger supported by the detent and holding the latch lever out of engagement with the actuator, a rocking of the detent dropping the trigger and holding the detent in rocked position and permitting the latch lever to engage with the actuator, and means for raising the trigger and thereby releasing the key depressed and restoring the latch lever, said means comprising a member carried by said actuator.

20. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in its depressed position, a trigger supported by the detent and holding the latch lever out of engagement with the actuator, a rocking of the detent dropping the trigger and holding the detent in rocked position and permitting the latch lever to engage with the actuator, and a hand operated lever for raising the trigger and thereby releasing the key depressed and restoring the latch lever.

21. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in depressed position, a trigger supported by the detent and holding the latch lever out of engagement with the actuator, a rocking of the detent dropping the trigger and holding the detent in rocked position and permitting the latch lever to engage with the actuator, and means carried by the actuator for holding the trigger in either of its raised or lowered position during the operation of the device.

22. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in depressed position, a trigger supported by the detent and holding the latch lever out of engagement with the actuator, a rocking of the detent dropping the trigger and holding the detent in rocked position and permitting the latch lever to engage with the actuator, and a flange carried by the actuator and engaging the trigger for holding it in either its raised or lowered position during the operation of the device.

23. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in its depressed position, a trigger supported by the detent and holding the latch lever out of engagement with the actuator, a rocking of the detent dropping the trigger and holding the detent in rocked position and permitting the latch lever to engage with the actuator, a hand operated lever for raising the trigger and thereby releasing the key depressed and restoring the latch lever, and means for preventing an actuation of the hand operated lever during the operation of the machine.

24. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in its depressed position, a trigger supported by the detent and holding the latch lever out of engagement with the actuator, a rocking of the detent dropping the trigger and holding the detent in rocked position and permitting the latch lever to engage with the actuator, a hand operated lever for raising the trigger and thereby releasing the key depressed and restoring the latch lever, and means for preventing an actuation of the hand operated lever during the operation of the machine, said means comprising a revolvable slotted member engaging one end of the said lever.

25. In an accounting device, the combination of a movable totalizer, a movable rack, a positively driven actuator, a segment adapted to engage the rack, a latch lever carried by the segment and adapted to engage with the actuator for latching the two together, keys, a detent rocked thereby for holding a depressed key in its depressed position, a trigger supported by the detent and holding the latch lever out of engagement with the actuator, a rocking of the detent dropping the trigger and holding the detent in rocked position and permitting the latch to engage with the actuator, a pivoted hand operated lever for raising the trigger thereby releasing the key depressed and restoring the latch lever, and a slotted rotatable member engaging the end of the hand operated lever and preventing a movement thereof on its pivot during the operation of the machine.

26. In an accounting device, the combination of a movable totalizer, a movable rack, a positively driven actuator, means for driving said actuator, locking means for said driving mechanism, a segment adapted to engage the rack, a latch lever to lock the segment to the actuator, keys for releasing said locking means and breaking said latch whereby the segment is differentially positioned, means for moving the totalizer into and out of cooperative relation with the rack, and some of said keys preventing the operation of the said means.

27. In a machine of the class described, the combination of a plurality of differentially adjustable racks, a movable frame, a movable totalizer carried by said frame, means for moving the frame to bring the totalizer into operative relation with the racks, means for adjusting the racks differentially in one direction, and means for simultaneously moving the totalizer a constant extent in the opposite direction whereby varying amounts are accumulated upon said totalizer.

28. In a machine of the class described, the combination of a plurality of adjustable racks, a movable frame, a movable totalizer carried by said frame, means for moving the frame to bring the totalizer into operative relation with the racks, means for adjusting the racks differentially in one direction, means for simultaneously moving the totalizer a constant extent in the opposite direction whereby varying amounts are accumulated upon said totalizer and keys controlling the differential adjustment of the racks.

29. In a machine of the class described, the combination of a movable totalizer, a movable rack, controlled means for moving the rack different distances in one direction, means for simultaneously moving the totalizer a constant distance over the racks in the opposite direction whereby variable amounts are accumulated upon said totalizer, and manipulative devices for controlling said rack moving means.

30. In a machine of the class described, the combination of a main operating mechanism, a movable frame carrying the totalizer, a movable rack, means operated by the main operating mechanism for moving the frame to bring the totalizer into and out of cooperative relation with the racks, a normally operative latch device connecting the frame with said means, a series of keys some of which when operated render the latch device inoperative, and hand operated means for releasing the operated keys and rendering said latch device operative.

31. In a machine of the class described, the combination of an operating mechanism, a totalizer mounted in a swinging frame, means intermediate the swinging frame and the operating mechanism for actuating the frame, a latch device for coupling and uncoupling said means from the frame, a pivoted member connected to said latch device for operating the same, a group of keys for actuating the pivoted member, a group of keys for locking the pivoted member, and said pivoted member preventing a simultaneous depression of a key in the first mentioned group with a key in the last mentioned group.

32. In a machine of the class described, the combination of an operating mechanism, a movable rack, a totalizer mounted in a swinging frame, and having movement relative to said rack to actuate the totalizer, means intermediate the swinging frame and the operating mechanism for actuating the frame, a latch device for coupling and uncoupling said means from the frame, a pivoted member connected to said latch device for operating the same, a group of keys for actuating the pivoted member, a group of keys for locking the pivoted member and means carried by said pivoted member for preventing a simultaneous depression of a key in the first mentioned group with a key in the last mentioned group.

33. The combination of a totalizer, an actuator, manipulative amount determining means, means for moving the totalizer and actuator simultaneously in opposite directions to enter in the totalizer an amount represented by the manipulative means.

34. The combination of a movable totalizer, a movable actuator, means for engaging the totalizer and actuator and moving the same in opposite directions, and means for disengaging the same and moving the totalizer to home position for effecting transfers.

35. The combination of a totalizer and actuator therefor each movable toward the other from normal, and means for establishing a cooperative relationship between the actuator and totalizer as they are moved from normal and for destroying such relationship before they are moved back toward normal.

36. The combination of a totalizer mounted for movement back and forth, an actuator therefor mounted for movement back and forth, their movements from normal being in directions toward each other, and means for causing said totalizer and actuator to engage during their movement from normal.

37. The combination of a movably mounted totalizer, a movable actuator therefor, means for moving one of said members differentially and the other invariably, and means for causing said members to engage for cooperation as they move in opposite directions.

38. The combination of a movably mounted totalizer element, an actuator movable with respect to the totalizer element, manipulative means for controlling the total movement of the actuator, and means for establishing a cooperative relation between the actuator and totalizer element during their movement to enter the amount determined by the manipulative means.

39. The combination of a totalizer controlling mechanism, a plurality of manipulative means, a pivoted member cooperating with said manipulative means for controlling said mechanism, an unslotted eccentrically arranged edge portion on said member normally in position to be engaged by some of said manipulative means, and means on said member adapted to be moved into cooperative relation with other of said manipulative means upon movement of said member.

In testimony whereof I affix my signature.

FREDERICK L. FULLER.

Certificate of Correction.

It is hereby certified that in Letters Patent No. 1,594,167, granted July 27, 1926, upon the application of Frederick L. Fuller, of Bridgeport, Connecticut, for an improvement in " Cash Registers," errors appear in the printed specification requiring correction as follows: Page 3, line 26, for the word " looking " read *locking;* page 4, line 115, after the word " lever " strike out the period and insert a comma; page 6, line 108, strike out the word " by," second occurrence; page 7, line 3, for the article " the " read *this;* page 8, line 109 for " Carrol " read *Carroll;* page 9, line 13, for the word " lever " read *arm;* page 10, line 57, claim 8. strike out the words " having one end connected to " and insert instead *for actuating;* same page and claim, line 60, strike out the words " for actuating " and insert instead the words *having one end connected to;* and that the said Letters Patent should be read with these corrections therein that the same may conform to the record of the case in the Patent Office.

Signed and sealed this 5th day of October, A. D. 1926.

[SEAL.]
M. J. MOORE,
*Acting Commissioner of Patents.*